United States Patent [19]

Guay

[11] Patent Number: 4,926,121

[45] Date of Patent: * May 15, 1990

[54] MAGNETIC TYPE POSITION SENSOR FOR USE IN THE CONSTRUCTION OF POSITION INDICATORS OR TORQUE METERS

[75] Inventor: Normand Guay, Boucherville, Canada

[73] Assignee: Consulab, Inc., Beauport, Canada

[*] Notice: The portion of the term of this patent subsequent to Nov. 29, 2005 has been disclaimed.

[21] Appl. No.: 243,859

[22] Filed: Sep. 13, 1988

Related U.S. Application Data

[63] Continuation-in-part of Ser. No. 33,195, Apr. 2, 1987, Pat. No. 4,787,255.

[51] Int. Cl.$^5$ ............................ G01B 7/30; G01B 7/24
[52] U.S. Cl. ................................. 324/208; 73/862.34; 324/209
[58] Field of Search ................................. 324/207–209, 324/228, 226, 227, 262, 251, 252, 232–235; 338/32 H; 73/862.34, 862.36

[56] References Cited

U.S. PATENT DOCUMENTS

| | | | |
|---|---|---|---|
| 2,947,168 | 8/1960 | Yang | 73/862.34 |
| 3,170,323 | 2/1965 | Kuhrt et al. | 73/862.34 |
| 3,185,920 | 5/1965 | Brunner | 324/208 X |
| 3,327,541 | 6/1967 | Clark et al. | 324/208 X |
| 4,572,005 | 2/1986 | Kita | 324/209 X |
| 4,784,002 | 11/1988 | Io | 324/208 X |
| 4,787,255 | 11/1988 | Guay | 73/862.34 |

FOREIGN PATENT DOCUMENTS

| | | |
|---|---|---|
| 0151089 | 8/1985 | European Pat. Off. . |
| 2231571 | 1/1974 | Fed. Rep. of Germany ... 73/862.34 |

*Primary Examiner*—Reinhard J. Eisenzopf
*Assistant Examiner*—Warren S. Edmonds
*Attorney, Agent, or Firm*—Cushman, Darby & Cushman

[57] ABSTRACT

A position sensor including a guide bar carrying a magnetic tape generating a magnetic field whose intensity varies sinusoidally along a longitudinal axis of the guide bar. A pick-up head is mounted adjacent the guide bar for translational movement therealong to detect the magnetic field. More particularly, the pick-up head comprises two magnetic field detectors spaced apart by a predetermined distance in the direction of translational motion of the pick-up head, each magnetic field detector generating an output signal representative of the magnetic field intensity at the position of detection thereof. By processing the output signals of the magnetic field detectors, it is possible to accurately determine the position of the pick-up head with respect to the guide bar. Advantageously, the position sensor may be used for the construction of a torque meter.

15 Claims, 4 Drawing Sheets

MAGNETIC TYPE POSITION SENSOR FOR USE IN THE CONSTRUCTION OF POSITION INDICATORS OR TORQUE METERS

FIELD OF THE INVENTION

The present invention relates to the general field of measuring devices and more particularly to a position sensor operating by measuring variations of a magnetic field. Advantageously, the position sensor may be used for construction of a torque sensor.

OBJECT AND STATEMENT OF THE INVENTION

Position sensors are currently used in the industry for determining the location of a movable machine part with respect to a certain reference. The sensors used may be simple mechanical devices or complex electronic systems, depending upon the desired degree of accuracy.

The present invention relates to a magnetic type sensor where the position is determined by measuring with a pick-up head variations of a magnetic field produced by a magnetic medium, the main object of the invention being to provide a magnetic type sensor which is of a simple and inexpensive construction and which is substantially unaffected by variations of the gap between the pick-up head and the magnetic medium.

In one embodiment, the position sensor comprises an elongated guide bar carrying a magnetic tape porducing a magnetic field with a position dependent intensity. A pick-up head is adapted for translational motion with respect to the guide bar and it measures the magnetic field intensity whose instantaneous value is indicative of the pick-up head position.

The pick-up head comprises a pair of Hall effect transducers mounted in magnetic cores and being spaced apart by a predetermined distance in the direction of translational movement of the pick-up head. Each Hall effect transducer generates a voltage representative of the magnetic field intensity at the transducer position on the guide bar, this voltage being also function, to a lesser extent, of the distance, or gap existing between the transducer core and the magnetic tape. By processing the output signals of the Hall effect transducers, knowing the distance between the transducers, it is possible to determine accurately the position of the pick-up head, regardless of differences in the gap from one position of the pick-up head to another at the condition that the gap fluctuations are the same for each transducer. This holds true if the distance between the transducers is relatively small and the magnetic field produced by the magnetic tape varies much faster than the gap fluctuates.

The pick-up head is coupled to a signal processing circuit which determines the position of the pick-up head from the output signals of the Hall effect transducers.

Advantageously, the position sensor may be used for the construction of a torque sensor to measure the torque transmitted from a prime mover to a load. The torque sensor comprises a pair of rotors rotatably mounted to a support and being connected to the prime mover and to the load, respectively. The rotors are spaced apart and connected to each other by a resilient element extending along an axis coincident with the rotation axis of the rotors. The resilient element acts as a transmission shaft between the rotors and under the effect of torque it will be twisted about its axis, the twist angle being proportional to the torque.

Each rotor is provided with a magnetic medium producing a magnetic field whose intensity is position dependent. A pick-up head is mounted adjacent each rotor to measure the magnetic field intensity in order to determine the phase shift between the magnetic media of the rotors, resulting from the twisting of the resilient element, which phase shift is representative of the twist angle. More particularly, one of the pick-up heads is provided with a single Hall effect transducer mounted in a magnetic core, the other pick-up head comprising two Hall effect transducers arranged the same way as in the case of the pick-up head described with relation to the previous embodiment of this invention relating to the position sensor.

The pick-up heads are connected to a signal processing circuit which determines the twist angle of the resilient element and, consequently, the torque.

Therefore, the present invention comprehends a position sensor, including:

a magnetic medium producing a magnetic field; and a pick-up head mounted adjacent the magnetic medium for detecting the magnetic field, the pick-up head and the magnetic medium being adapted for translational movement one with respect to the other, the magnetic field having a continuously variable intensity along the direction of said translational movement, the pick-up head comprising:
  (a) a first magnetic field detector generating an output signal representative of the intensity of the magnetic field at the position of detection thereof by the first detector; and
  (b) a second magnetic field detector generating an output signal representative of the intensity of the magnetic field at the position of detection thereof by the second detector, the second detector being spaced from the first detector by a predetermined distance along the direction of said translational movement, the first and second detectors being adapted to be connected to a signal processing circuit deriving position information from the output signals.

The invention also extends to a torque sensor, comprising:

a rotatable torsion shaft adapted to be operatively connected to a prime mover and to a load for transmitting torque which is to be detected, the torque producing a twist in the torsion shaft;

first and second magnetic media mounted at axially spaced locations on the torsion shaft, each magnetic medium producing a magnetic field with an intensity continuously varying in a peripheral direction of the torsion shaft;

first and second pick-up heads mounted adjacent said first and said second magnetic media respectively, for detecting the magnetic fields and generating in turn output signals, the first pick-up head including a pair of magnetic field detectors spaced apart by a predetermined distance in a peripheral direction of the torsion shaft, each magnetic field detector generating an output signal representative of the intensity of the magnetic field at the position of detection thereof by the magnetic field detector, the pick-up heads being adapted to be operatively connected to a signal processing circuit for deriving torque information from the output signals of the pick-up heads.

BRIEF DESCRIPTION OF THE DRAWINGS

Throughout the drawings, similar elements are identified by the same reference numerals.

DESCRIPTION OF A PREFERRED EMBODIMENT

Figure 1:
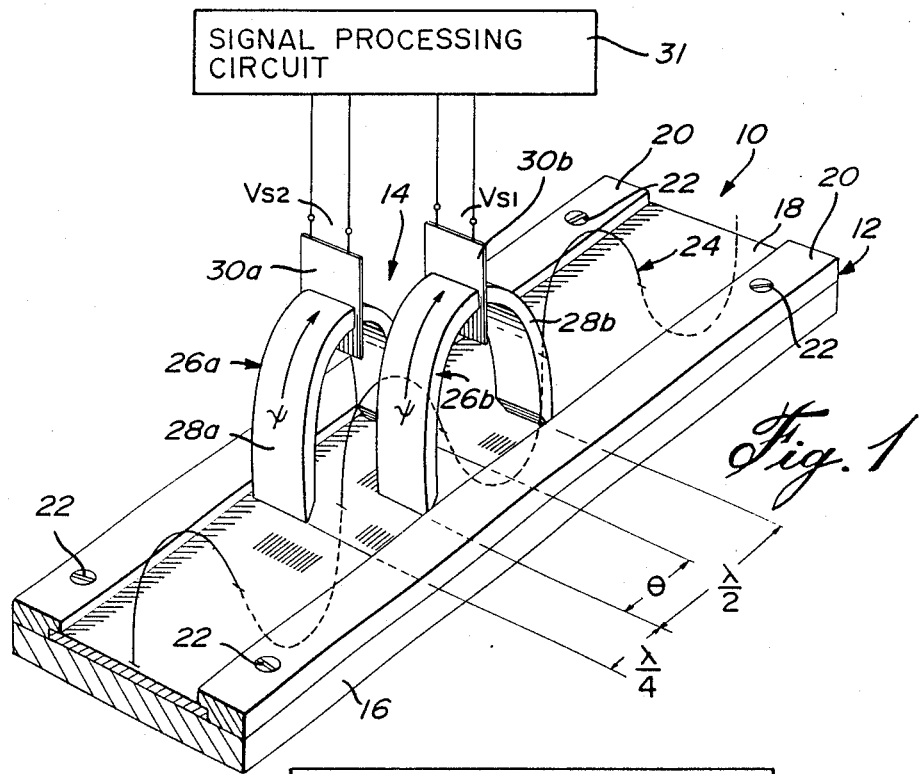
FIG. 1 is a perspecitve view of a linear movement position sensor, according to the invention.

Referring now to FIG. 1, the reference numeral 10 designates, in general, a position sensor comprising a stationary and straight guide bar 12 receiving a cursor 14 capable of linear translational motion on the guide bar 12. Normally, the cursor 14 is mounted to a movable machine part whose position is to be determined with respect to the guide bar 12.

The guide bar 12 which constitutes a race for the cursor 14 is of a constant cross-section along the length thereof which is selected according to the range of motion of the cursor 14. The guide bar 12 comprises a flat metallic base plate 16 on the top surface of which is adhesively mounted a centrally located and longitudinally extending magnetic tape 18 whose side edges are clamped on the base plate 16 by retaining bars 20 secured to the base plate 16 by means of screws 22.

The magnetic tape 18 produces a magnetic field whose intensity varies sinusoidally along the longitudinal axis of the tape. In FIG. 1, the magnetic field is shown schematically as a sine wave identified by the reference numeral 24, the portion of each cycle of this wave which corresponds to a positive magnetic polarity is shown with full lines, the negative portion of the cycle being identified by dotted lines.

The magnetic field is built in the tape 18 by a magnetic recording process.

The cursor 14, acting as a pick-up head for the magnetic field, comprises two identical detectors 26a and 26b, the detector 26a including a magnetic core 28a shaped as a half torus and a magnetic flux to voltage transducer, such as a Hall effect transducer 30a inserted in the magnetic path defined by the core 28a.

The elements of the detector 26b, identical to those of the detector 26a, bear the same reference numerals followed by the suffix "b".

The detectors 26a and 26b are spaced apart along the longitudinal axis of the magnetic tape 18 by a distance corresponding to a quarter of the wavelength of the magnetic signal 24 recorded on the tape 18.

Although not shown in the drawings, it is to be understood that the detectors 26a and 26b are fixedly mounted to each other. Typically, the detectors will be mounted into a protective block from which extend only the four output conductors of the Hall effect transducers 30a and 30b.

The cursor 14 is normally suspended from the machine part to which it is coupled so that it does not contact the top surface of the magnetic tape 18 to prevent abrasion thereof. Therefore, air gaps are defined between the free extremities of the magnetic cores 28a and 28b and the tape 18.

Figure 2:
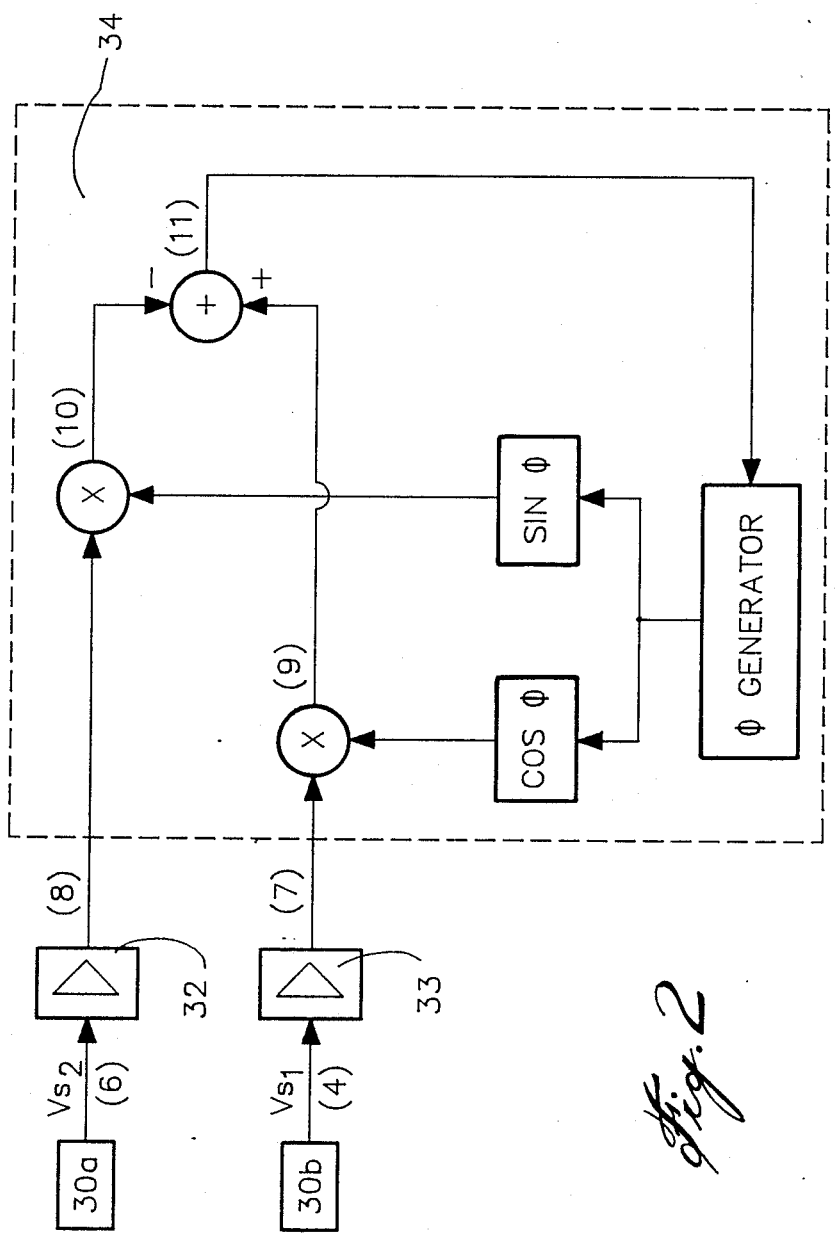
FIG. 2 is a functional block diagram of a signal processing circuit for use with the position sensor shown in FIG. 1.

The Hall effect transducers 30a and 30b are connected to a signal processing circuit 31 defining in combination with the position sensor 10, a position determining device. The functional block diagram of the signal processing circuit 31 is shown in FIG. 2.

The signal processing circuit 31 comprises an analog section coupled to a suitably programmed microcomputer. The hardware and the software of the signal processing circuit 31 are not described in detail because they are well within the reach of a man skilled in the art.

The operation of the position sensor 10 will be described hereinafter in conjunction with FIG. 2.

The intensity of the magnetic field 24 recorded on the tape 18 varies according to the position of the cursor 14 and, more particularly, according to the position angle $\theta$ of the cursor, measured from a reference point on the guide bar 12, such as one of the extremities thereof. This may be described by the following mathematical relation:

$$\beta = \beta_{max} \cdot \sin \theta \tag{1}$$

where:

$\theta = (2 \cdot \pi / \lambda) \cdot d$ d = travel distance of the cursor 14 and $\lambda$ = the wavelength of the magnetic field The magnetic field recorded on the magnetic tape 18 produces in each of the cores 28a and 28b, a magnetic flux $\phi$ whose intensity depends essentially on the cross-sectional area of the magnetic core and the air gap between the free edges of the core and the top surface of the magnetic tape 18. The magnetic flux $\phi$ may be expressed by the following relations:

$$\phi = \int_A \beta \, max \cdot dA \cdot \sin \theta \tag{2}$$

$$\phi = \phi \, max \cdot \sin \theta \tag{3}$$

The Hall effect transducer 30b in the magnetic circuit of the detector 26b generates an electric signal that may be expressed by:

$$V_{S1} = S_1 \cdot \sin \theta \tag{4}$$

where: $S_1$ = the signal amplitude

The hall effect transducer 30a of the detector 26a located at a distance of $\lambda/4$ from the detector 26b, generates an electric signal which may be expressed by:

$$V_{S2} = S_2 \cdot \sin (\theta + \pi/2) \tag{5}$$

$$V_{S2} = S_2 \cdot \cos \theta \tag{6}$$

where: $S_2$ = the signal amplitude

Defects in the construction of the guide bar 12 such as warping along the longitudinal axis thereof, non uniformities of the retaining bars 20, variations in the thickness of the magnetic tape 18, among others, produce inevitably variations in the air gaps between the free edges of the magnetic cores 28a and 28b and the top surface of the tape 18 during the translational motion of the cursor 14. These variations result in fluctuations of the amplitude values $S_1$ and $S_2$ along the tape 18. These fluctuations may be considered as a wave having a wavelength much longer than the wavelength of the magnetic field recorded on the tape 18.

When the core 28a of the detector 26a slides along the magnetic tape 18, it channels, at a certain position (the angle $\theta$ being nul), the minimum magnetic flux. The core 28b of the detector 26b, spaced from the detector 26a by a distance of $\lambda/4$ channels the maximum magnetic flux.

When the cursor 14 moves forward on the guide bar by a distance corresponding to $\lambda/4$, (the angle $\theta$ being equal to $\pi/2$), the magnetic core 28a channels the maximum magnetic flux. The core 28b of the detector 26b channels then the minimum magnetic flux.

The outputs of the Hall effect transducers 30a and 30b are coupled to calibrating circuits 32 and 33, respectively, which set the voltages $S_1$ and $S_2$ to a predetermined level S. The calibrating circuits are basically operational amplifiers with an adjustable gain.

The output signals of the calibrating circuits 32 and 33 may be expressed as follows:

$$V_{S_1} = S \cdot \sin\theta \quad (7)$$

$$V_{S_2} = S \cdot \cos\theta \quad (8)$$

As stated above, the amplitudes of the output signals generated by the transducers 30a and 30b, vary according to a wave which has a wavelength much longer than the wavelength of the magnetic field recorded on the tape 18, when the cursor 14 moves on the guide bar. Since the magnetic cores 28a and 28b are very close to one another, when $S_1$ varies then $S_2$ will vary in a similar manner.

A micro-computer 34, coupled to the calibrating circuits 32 and 33, generates a value of an angle $\phi$ (normally having an initial value zero), and then calculates the cosine and the sine of this angle and multiplies respectively the obtained values by the equations 7 and 8 to obtain:

$$V_{S_1} \cdot \cos\phi = S \cdot \sin\theta \cdot \cos\phi \quad (9)$$

$$V_{S_2} \cdot \sin\phi = S \cdot \cos\theta \cdot \sin\phi \quad (10)$$

The micro-computer 34 then substracts signal 10 from signal 9 to obtain an error signal Z:

$$Z = S \cdot [\sin\theta \cdot \cos\phi - \cos\theta \cdot \sin\phi] \quad (11)$$

$$Z = S \cdot \sin(\theta - \phi)$$

According to the polarity and the value of the error signal Z, the micro-computer 34 will increase or decrease the value of the angle $\phi$ and it will re-execute the above operations as many times as necessary until the error signal Z is rendered nul. Then, the angle $\phi$ will be displayed which corresponds to the angle $\theta$, from which the position of the cursor 14 may be determined knowing the wavelength of the magnetic field 24.

It should be appreciated that the angle $\phi$ is obtained regardless of the amplitude values S and S, in other words, the measurement of the cursor position is independent from the air gaps between the magnetic cores 28a and 28b and the tape 18.

SECOND EMBODIMENT

Figure 3:
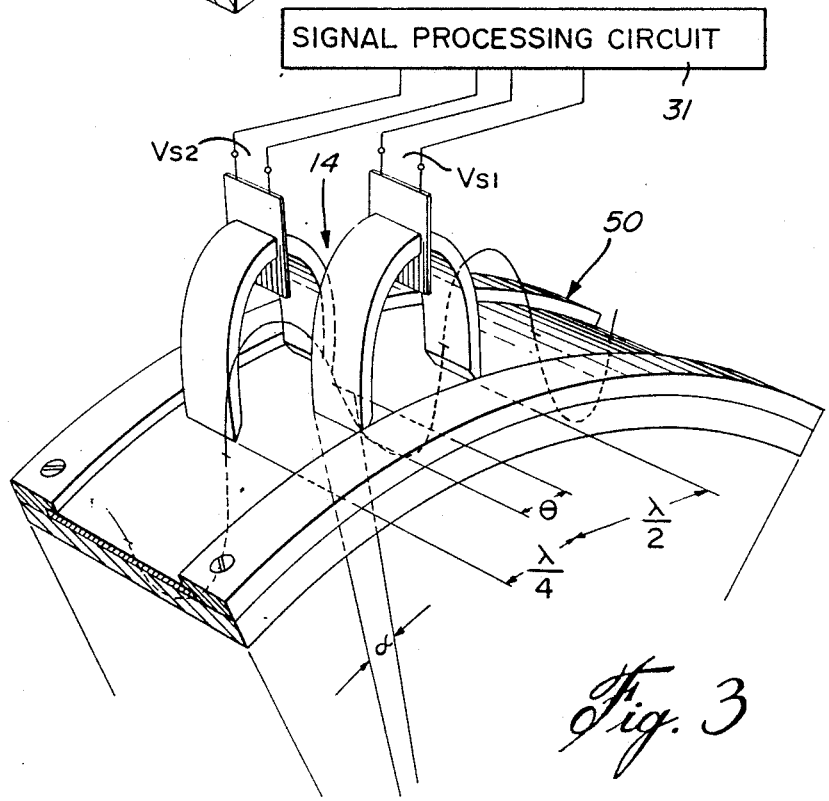
FIG. 3 is a perspecitve view of a rotating movement position sensor, according to the invention.

FIG. 3 illustrates an embodiment of the position sensor, for use with a rotary machine. By comparison with the embodiment shown in FIG. 1, the guide bar 50 is shaped as an annular body to define a circular path (for simplicity FIG. 2 shows the guide bar 50 extending only along short arc). In use, the guide bar 50 will normally be mounted to the rotating part of the machine and the cursor 14 will be stationary.

The determination of the cursor position 14 with respect to the guide bar 50 is performed in the same manner as described with relation to the embodiment of FIG. 1. If desired to obtain the position of the cursor 14 in terms of angular displacement $\alpha$, the value obtained for the angle $\theta$ is to be divided by the number of cycles of the magnetic field on the length of tape defining the circular path.

THIRD EMBODIMENT

Figure 4:
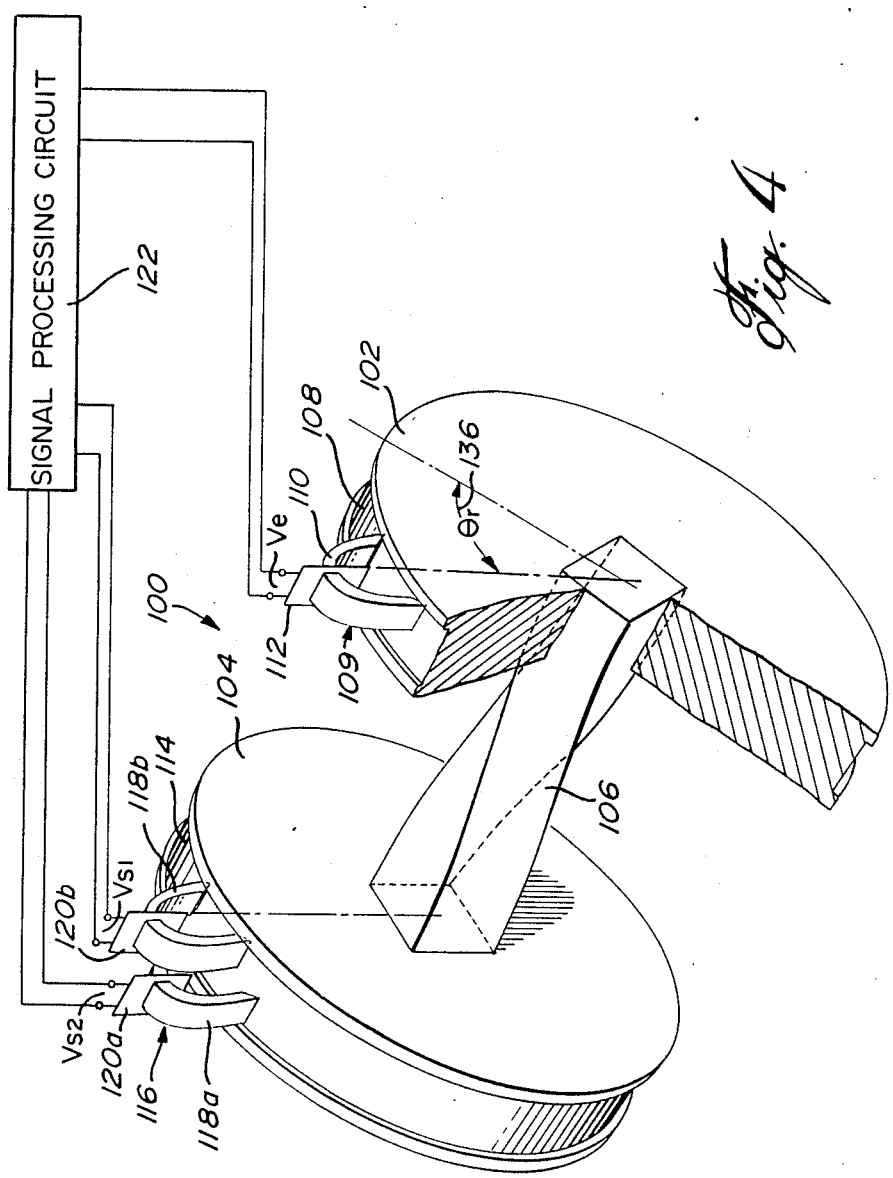
FIG. 4 is a schematical view of a torque sensor, according to the invention.

FIG. 4 illustrates a schematical view of a torque detector utilizing a sensor position of the type described in relation with FIGS. 1 and 3.

The torque detector includes a torque sensor identified generally by the reference numeral 100, comprising a pair of disks 102 and 104 connected to each other by a resilient element 106. The disks 102 and 104 are mounted in suitable bearings (not shown in drawings for simplicity) for rotation about an axis which is coincident with the longitudinal axis of the resilient element 106.

The disk 102, designated hereinafter as "input disk" is to be connected to a prime mover which drives a load connected to the disk 104, designated hereinafter as "output disk", the power from the prime mover to the load being transmitted through the resilient member 106 which will be twisted about its longitudinal axis by an angle proportional to the transmitted torque, the proportionality constant depending upon the material of the resilient element 106 and of its size.

The input disk 102 comprises a circumferentially extending magnetic tape 108 producing a magnetic field varying sinusoidally in a circumferential direction of the disk 102, in a similar way as the magnetic tape 18 of the embodiment shown in FIG. 1. Adjacent to the top surface of the tape 108 is mounted a stationary pick-up head 109 constituted by a single detector comprising a magnetic core 110 and a Hall effect transducer 112. The detector 109 is identical in construction to the detectors 26a or 26b described in relation to the first embodiment of this invention.

The output disk 104 is provided on the periphery thereof with a magnetic tape 114, identical to the tape 108, the magnetic field recorded on the tape 114 being in phase with the magnetic field on the tape 108 when the resilient element 106 is not twisted. A stationary pick-up head 116 is mounted adjacent to the top surface of the tape 114, the pick-up head 116 comprising detectors 118a and 118b with Hall effect transducers 120a and 120b, respectively. The pick-up head 116 is identical in construction to the cursor 14 described in relation to the first embodiment of this invention.

The Hall effect transducers 120a and 120b associated with the output disk 104, and the transducer 112 associated with the input disk 102 are connected to a signal processing circuit 122 which will process the signals generated by these transducers, the combination between the torque sensor 100 and the circuit 122 constituting a torque meter. The electronic circuit 122 comprises an analog section coupled to a suitably programmed micro-computer. The hardware and the software of this circuit will not be described in detail because their realization is within the reach of a man skilled in the art.

Figure 5:
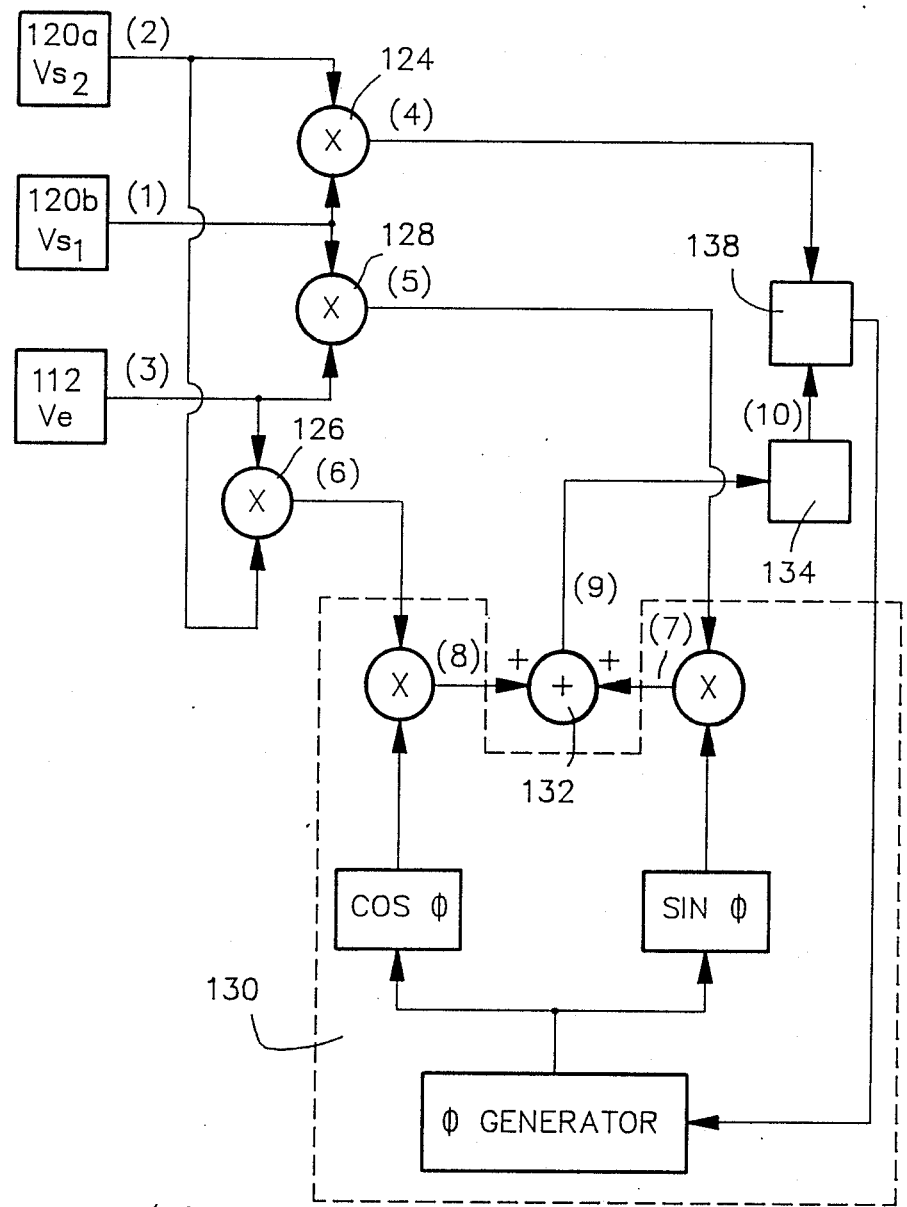
FIG. 5 is a functional diagram of a signal processing circuit for use with the torque sensor shown in FIG. 4.

The operation of the torque sensor 100 will be described hereinafter in relation to FIG. 4 and to FIG. 5:

When the input disk 102 is driven by the prime mover, it will drive, by the intermediary of the resilient member 106, the load connected to the output disk 104. The twist angle $\theta r$, shown in FIG. 4 of the resilient member 106, is proportional to the transmitted torque.

The Hall effect transducers 120a and 120b coupled with the output disk 104 generate the following electric signals:

$$V_{s1} = S \cdot \sin \omega t \quad (1)$$

$$V_{s2} = S \cdot \cos \omega t \quad (2)$$

where: $\omega$ is the angular velocity of the tape 114 and t is the time.

The Hall effect transducer 112 coupled with the input disk 102 generates the following signal:

$$V_e = E \cdot \sin(\omega t + \theta) \quad (3)$$

where:
E = the amplitude of the signal generated by the transducer 112;
$\theta$ = the phase angle between the signals 1 and 3, $\theta$ also being equal to $K \cdot \theta r$, where $\theta r$ is the twist angle of the elastic member 106 and K is an integer corresponding to the number of cycles of the magnetic field on the length of tape 108.

The signal processing circuit 122 comprises an analog multiplier 124, coupled to the Hall effect transducers 120a and 120b to multiply the signals (1) and (2) to produce a reference signal $V_r$:

$$V_r = S^2/2 \cdot \sin 2\omega t \quad (4)$$

Analog multipilers 126 and 128 coupled to the Hall effect transducers 120a, 120b and 112, multiply signals (1) and (2) by signal (3) to obtain the following signals:

$$V_e \cdot V_{s1} = \frac{E \cdot S}{2} [(1 - \cos2\omega t) \cdot \cos\theta + \sin2\omega t \cdot \cos\theta] \quad (5)$$

$$V_e \cdot V_{s2} = \frac{E \cdot S}{2} [\sin2\omega t \cdot \cos\theta + (1 + \cos2\omega t) \cdot \sin\theta] \quad (6)$$

A micro-computer 136 coupled to the multipliers 126 and 128 generates the value of an angle $\phi$ (normally having an initial value zero), calculates the sine and the cosine of this angle and multiplies respectively the values thus obtained by signals 5 and 6 to obtain the following signals:

$$V_e \cdot V_{s1} \cdot \sin\phi = \quad (7)$$
$$\frac{E \cdot S}{2} [\sin\phi \cdot \cos\theta - \cos2\omega t \cdot \sin\phi \cdot \cos\theta + \sin2\omega t \cdot \sin\phi \cdot \sin\theta]$$

$$V_e \cdot V_{s2} \cdot \cos\phi = \quad (8)$$
$$\frac{E \cdot S}{2} [\sin\theta \cdot \cos\phi - \cos2\omega t \cdot \sin\theta \cdot \cos\phi + \sin2\omega t \cdot \cos\theta \cdot \cos\phi]$$

An analog adder 132 coupled to the computer 130 adds signals 7 and 8 to obtain an error signal Z:

$$Z = \frac{E \cdot S}{2} [\sin(\theta - \phi) + \cos2\omega t \cdot \sin(\theta - \phi) + \sin2\omega t \cdot \cos(\theta - \phi)] \quad (9)$$

A circuit 134 coupled to the adder 132 eliminates therefrom the portion which does not vary with respect to time (the DC component of the signal) to obtain a new error signal Z:

$$Z = \frac{E \cdot S}{2} [\cos2\omega t \cdot \sin(\theta - \phi) + \sin2\omega t \cdot \cos(\theta - \phi)] \quad (10)$$

$$Z = \frac{E \cdot S}{2} \cdot \sin(2\omega t + \theta - \phi)$$

Facing the input disk 102, the polarity of the following parameters is defined as follows:

(a) The angular velocity $\omega$ is positive when the input disk rotates clockwise;

(b) The twist angle $\theta r$ is positive when the resilient element 106 is twisted in the direction identified by the arrow 136. Thus, the transmitted torque is also positive since it is proportional to the twist angle $\theta r$; and (c) The transmitted power P is also positive since the angular velocity $\omega$ and the transmitted torque T are positive.

To avoid ambiguities, the twist angle is limited to $\pm \pi/K$.

An electronic circuit 138 coupled to the circuit 134 measures the phase angle between the signals 10 and 4. When the meaurement has been carried out, the circuit will generate a pulse train whose frequency is proportional to the phase angle and a code to identify the polarity of the phase angle.

The micro-computer 130 coupled to the circuit 138 receives the pulse train and the code and it will increase or decrease accordingly the value of the angle $\phi$. The micro-computer 130 will then re-execute the above operations as many times as necessary until the error signal Z becomes nul. When this condition is met, the micro-computer will display the angle $\phi$ which is equal to the angle $\theta$. Considering that the torque is proportional to the angle $\theta$ or the twist angle $\theta r$, the displayed value is indicative of the torque transmitted.

It should be appreciated that as in the case of the position sensors described in relation with FIGS. 1 and 2, the torque measurement is independent of air gaps or construction defects such as excentricity of the bearings supporting the disks 102 and 104, among others.

I claim:

1. A position sensor, comprising:
a magnetic tape constituting a magnetic medium producing a magnetic field;
a pick-up head mounted adjacent said magnetic tape for detecting said magnetic field, said pick-up head and said magnetic medium being mounted for translational movement relative to one another, said magnetic field having a continuously variable intensity along the direction of said translational movement, said pick-up head comprising:
(a) a first magnetic field detector generating an output signal representative of the intensity of said magnetic field at the position of detection thereof by said first detector; and
(b) a second magnetic field detector generating an output signal representative of the intensity of said magnetic field at the position of detection thereof by said second detector, said second detector being spaced from said first detector by a predetermined distance along the direction of said translational movement, said first and second detectors being connected to a signal processing circuit deriving position information from said output signals; and a guide bar, including:
(a) a metallic base plate, said magnetic tape being adhesively mounted on said base plate; and
(b) a pair of clamping bars mounted on said base plate and clamping the lateral edges of said tape.

2. A position sensor as defined in claim 1, wherein said first and second detectors each comprise a magnetic core constituting means to establish a magnetic path and a magnetic flux to voltage transducer in said magnetic path.

3. A position sensor as defined in claim 2, wherein said magnetic flux to voltage transducer is a Hall effect transducer.

4. A position sensor as defined in claim 1, wherein the intensity of said magnetic field varies sinusoidally in a longitudinal direction of said magnetic medium.

5. A position sensor as defined in claim 1, wherein said guide bar is straight.

6. A position sensor as defined in claim 1, wherein said guide bar is annular.

7. A position sensor as defined in claim 4, wherein said magnetic field detectors are spaced apart by a distance corresponding approximately to a quarter of the wavelength of said magnetic field.

8. A torque sensor, comprising:
a rotatable torsion shaft operatively connected to a prime mover and to a load for transmitting from said prime mover to said load torque which is to be detected, said torque producing a twist in said torsion shaft;

first and second magnetic tapes mounted at axially spaced locations on said torsion shaft, each magnetic tape constituting a magnetic medium producing a magnetic field with an intensity varying in a peripheral direction of said torsion shaft;

first and second pick-up heads mounted adjacent said first and said second magnetic tape, respectively, for detecting the magnetic fields in generating in turn output signals, said first pick-up head including a pair of magnetic field detectors spaced apart by a predetermined distance in a peripheral direction of said torsion shaft, each magnetic field detector generating an output signal representative of the intensity of said magnetic field at the position of detection thereof by the magnetic field detector, said pick-up heads being operatively connected to a signal processing circuit for deriving torque information from the output signals of said pick-up heads; and first and second guide bars, each including:
(a) a metallic base plate, said magnetic tape being adhesively mounted on said base plate; and
(b) a pair of clamping bars mounted on said base plate and clamping the lateral edges of said tape.

9. A device as defined in claim 8, wherein said second pick-up head includes a single magnetic field detector.

10. A device as defined in claim 8, wherein each magnetic field detector includes a magnetic core establishing a magnetic path, and a magnetic flux to voltage transducer in said path.

11. A device as defined in claim 10, wherein said magnetic flux to voltage transducer is a Hall effect transducer.

12. A device as defined in claim 9, wherein the magnetic field detector of said second pick-up head includes a magnetic core establishing a magnetic path, and a magnetic flux to voltage transducer placed in said magnetic path.

13. A device as defined in claim 12, wherein said magnetic flux to voltage transducer is a Hall effect transducer.

14. A device as defined in claim 8, wherein each of said magnetic fields varies sinusoidally.

15. A device as defined in claim 14, wherein the magnetic field detectors of said first pick-up head are spaced apart from each other by a quarter of the wavelength of said magnetic field.

* * * * *